Nov. 23, 1965     M. V. KALFAIAN     3,219,934
FREQUENCY CONVERSION SYSTEM
Filed Sept. 25, 1962                5 Sheets-Sheet 4

INVENTOR.

Fig.6

United States Patent Office 3,219,934
Patented Nov. 23, 1965

3,219,934
FREQUENCY CONVERSION SYSTEM
Meguer V. Kalfaian, 962 Hyperion Ave.,
Los Angeles, Calif.
Filed Sept. 25, 1962, Ser. No. 226,133
7 Claims. (Cl. 328—15)

This invention relates to a system of recording and reproducing a complex wave, and more particularly to a system for shifting the resonance spectrum of a propagated complex wave located variably within the total bandwidth of voice spectrum to a reference region, for standardizing the resonance structure of said complex wave. An object of the present invention is to record an incoming complex wave having unknown time base period, and reproduce it repeatedly in backward and forward directions during reference time base periods. And the principal object of the present invention is to provide sequential distributor means for sampling and storing various amplitudes of the incoming wave during said recording time period, and resampling said stored samples in backward and forward distribution during said reproducing time base periods. It is contemplated, therefore, to eliminate the retrace time period that is usually required after each reproduction of the recorded complex wave when only forward direction is utilized for reproduction.

The resonance structure of a complex wave is often desired to be analyzed by recording its first, and reproducing it afterwards. When the various resonances contained in the recorded wave are of short duration, it becomes necessary to reproduce the recorded wave several times for obtaining detectable output signals from the various filter circuits that may be utilized for said analysis. When the signal levels at the beginning and ending of the recorded wave are widely different, sawtooth scanning of the recorded wave with retrace action may be objectionable, because the sudden changes in signal levels, or, sometimes oppositely poled, will cause high filtering action through the associated filter circuits; this filtering action varying intermediately depending upon the differences in signal levels at the beginning and ending of the recorded waveform. The recorded complex wave may be a representation of some intelligence, for example, in speech sound waves. As such recording may be a portion of a repetitious sound wave, to be reproduced continuously at a later time period, for example, after being transmitted through a narrow band transmission channel, it does not matter whether the recorded wave is scanned in forwrad or in backward direction, or further yet, alternately in forward and backward directions. This condition is true, because intelligence of the sound is not transmitted through phase variations of the wave, but through its various frequency components, which would not alter through the latter mode of scanning. Thus, instead of utilizing reproduction sawtooth waves having only forward direction, and including retrace time periods between repetitions, we may use symmetric forward and backward sawtooth waves, with complete elimination of the retrace periods.

The use and advantages of symmetric sawtooth wave scansion for reproducing recorded waves have been described in my U.S. patent application Serial No. 857,121 filed Dec. 3, 1959, now patent No. 3,064,240, Nov. 13, 1962. The system described therein, however, utilizes a storage tube for recording and reproducing the complex wave. Such storage tubes in the present state of the art have various limitations in performance, such as inadequate number of storage elements; low signal to noise ratio; poor half tone signal transfer; slow signal erase time period; and insufficient amplitude in the signal output. Accordingly, it is contemplated herein to provide a sequential distributor means with a large number of storage elements for distributing sampled quantities of the complex wave to be recorded among said storage means, and resampling said stored quantities by said distributor means during reproducing time period, thereby simulating the performance of a storage tube, but in a more adequate manner. A sampling distributor of this type had been disclosed in my U.S. Patent No. 3,052,757, Sept. 4, 1962, and the present disclosure is a further improvement in both system and apparatus.

The invention will be better understood from the following details description of the preferred illustrative embodiments in conjunction with the appended drawings, wherein.

In conventional practice for recording and reproducing a complex wave, the usual terms are write and read, respectively. Accordingly, the terms write and read will, in most, be used hereinafter in referring to the terms, recording and reproducing, respectively. Thus, in order to briefly describe the present invention, a pulse generator is first rendered to produce signal-sampling pulses at a normal frequency rate during write time period, then the number of these produced pulses is memorized, and according to this memorized number the frequency of a variably controllable pulse generator is shifted for producing the same number of pulses during a reference read time base period for reproducing the sampled signals, either directly or by means of sequential gating. Another feature of the system described herein is an arrangement for reproducing the sampled signals in forward and backward directions repeatedly, instead of reproducing in only forward direction, as practiced conventionally. This requires a distributor system which can operate in both forward and backward directions. The signal-count arrangement may either be represented by the quantity of charge in a capacitor for shifting the frequency of a controllable oscillator, or a second distributing arrangement operated simultaneously with the first during write period, and stay idle at the last operated point for controlling the operating point of the first distributor. This latter arrangement will be described herein.

The distributor consists of a series of flip flops, so arranged that, each flip flop becomes active only once during a complete distribution sweep for producing an output pulse or a switching pulse. Due to the large number of sample distribution required, two sets of distributors are used, one set for digit count and one set for unit count, for example, each set comprising 26 flip flops will provide a distribution of 676 signal samples per maximum sweep either in forward or backward direction. Coacting with this distributor arrangement, there is provided a fixed frequency pulse generator for operating the distributor at a normal frequency during write time base period, and a variably controllable oscillator for producing the proper number of pulses during read time base period.

*Storage system*

Figure 1:
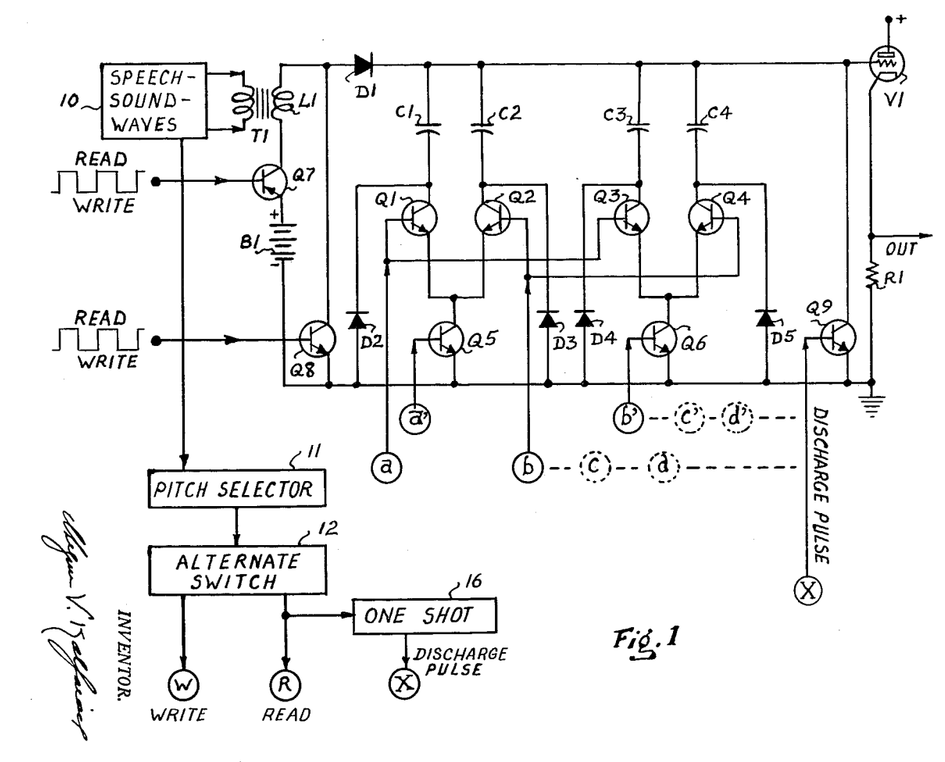
FIG. 1 is a schematic diagram of the storage system according to the invention.

The storage system comprises a plurality of capacitors among which the signal voltages are distributed sequentially during write time base period, and reproduced sequentially during read time base period. These capacitors are chosen substantially of large size, terminating to a high impedance load, so that many reproductions may be made without effecting noticable discharge of the stored electrical quantities among them. The arrangement is shown in FIG. 1, wherein only four capacitors C1 through C4 are shown for simplicity of drawing, as any large number would be repetitions thereof. These capacitors are gated to either input or output terminating points by individual switching transistors, for example, by Q1 through Q4, respectively. While there are used as many switching transistors (Q1 to Q4) as storage capacitors (C1 to C4), the transistors Q1 through Q4 are grouped in operation, for example, Q1, Q2 being in one group, and Q3, Q4 being in another group. Each group of these transistors are connected in series with a single switching transistor as isolating gate means, so as to allow parallel connections of the groups of transistors. For example, the base elements of Q1 and Q2 in the first group are connected in parallel with the base elements of Q3 and Q4 in the second group, respectively, for parallel operation, but only one group being active at a time by the series connected switching transistors Q5 or Q6. Thus, sequential signal-distribution among storage capacitors C1 through C4, etc., are performed by the switching transistors Q1, Q2 and Q3, Q4 in the first and second groups, etc., in digit counts, and by the series connected switching transistors Q5 and Q6, etc., in unit counts.

In operation, the switching transistors Q1 through Q6 are initially adjusted to be in OFF states. During write time base period when the input signal is to be distributed among C1 through C4 sequentially, the transistors Q5 and Q1 are first switched in ON positions simultaneously, followed by the switching of Q2 while Q1 is OFF and Q5 is still in ON position. After operation of Q2 is a short pulse period, the Q5 is rendered in OFF position, and Q3, Q6 are switched in ON positions simultaneously, followed by the ON switching of Q4 while Q3 is OFF and Q6 is still in ON position, in the previous mode. Thus the lower terminals of storage capacitors C1 through C4 are grounded sequentially in short pulse periods. The upper terminals of these capacitors are connected in parallel, and terminated to the signal producing source, which may comprise, for example, the secondary coil L1 of transformer T1, in series with switching transistor Q7, and a bias source B1. The input signal may be of any complex form, or pure sine wave, and may be produced across a resistive load, instead of the transformer T1. Assuming the use of L1, however, the bias voltage of B1 is adjusted to be equal or larger than the maximum peak signal voltage that takes place across L1. Thus assuming that during write time base period the switching transistor Q7 is in ON position, and the capacitors C1 through C4 are grounded sequentially, they are sequentially charged to the instantaneous potential values appearing across L1. At the end of write time base period, the switching transistor Q7 is rendered in OFF position, so that the parallel connected upper terminals of capacitors C1 through C4 remain free without appreciable load imposed upon them.

During read time base period, the switching transistors Q1 through Q6 are switching in ON positions in the same fashion as during write period, and ground the lower terminals of floating capacitors C1 through C4 sequentially. Thus, each time a capacitor is grounded, the grid electrode of electron tube V1 receives the voltage across that particular capacitor, and the tube in turn transfers a proportional voltage across its cathode circuit resistor R1, which serves as a low impedance output source by cathode follower action. The use of electron tube V1 is to avoid any appreciable load upon the capacitors C1 through C4. However, the field effect transistors are also high impedance devices, and they may be substituted as well.

In FIG. 1, it will be noted that any one of the capacitors C1 through C4 may assume a larger potential than the potential of bias battery B1, for the reason that a capacitor will charge to the potential of B1 plus or minus the instantaneous potential across T1. Thus during read period when the switching transistor Q7 is in OFF position, its collector electrode may see a reverse potential and cause discharge of some of the capacitors C1 through C4. Inclusion of diode D1 is one way of isolating the reverse potential upon the collector electrode of Q7. To further improve isolation of the signal circuit from the capacitors C1 through C4, the junction terminal between diode D1 and coil L1 may be shunted to ground during read period, by the switching transistor Q8; the latter being rendered in ON state during read period and in OFF state during write period.

Prior to write states of the capacitors C1 through C4, they must be first discharged of their previously stored electrical quantities. This may be easily achieved by the diodes D2 through D5 which are individually connected to the capacitors C1 through C4 respectively, and the common shorting transistor Q9. Since the parallel connected upper terminals of capacitors C1 through C4 are in floating states during read period, the diodes D2 through D5 are incapable of discharging the capacitors. However, during discharge time when the transistor Q9 is rendered conductive, a short circuit loop is formed between said diodes and capacitors, effecting the necessary discharge of same.

*Distributor system*

The distributor comprises a series of reset flip flop circuits which may operate sequentially either in forward or backward direction. This type of operation is achieved by first cross coupling each succeeding flip flop with that of the preceding one in a manner as to prevent change of state of the preceding ones by applied pulses to their inputs, and second, by applying unidirectional input pulses alternately to the same halves of the successive flip flops, the same sequence being reversed for backward operation. The arrangement in FIG. 2 shows in detail how such operation may be achieved.

Figure 2:
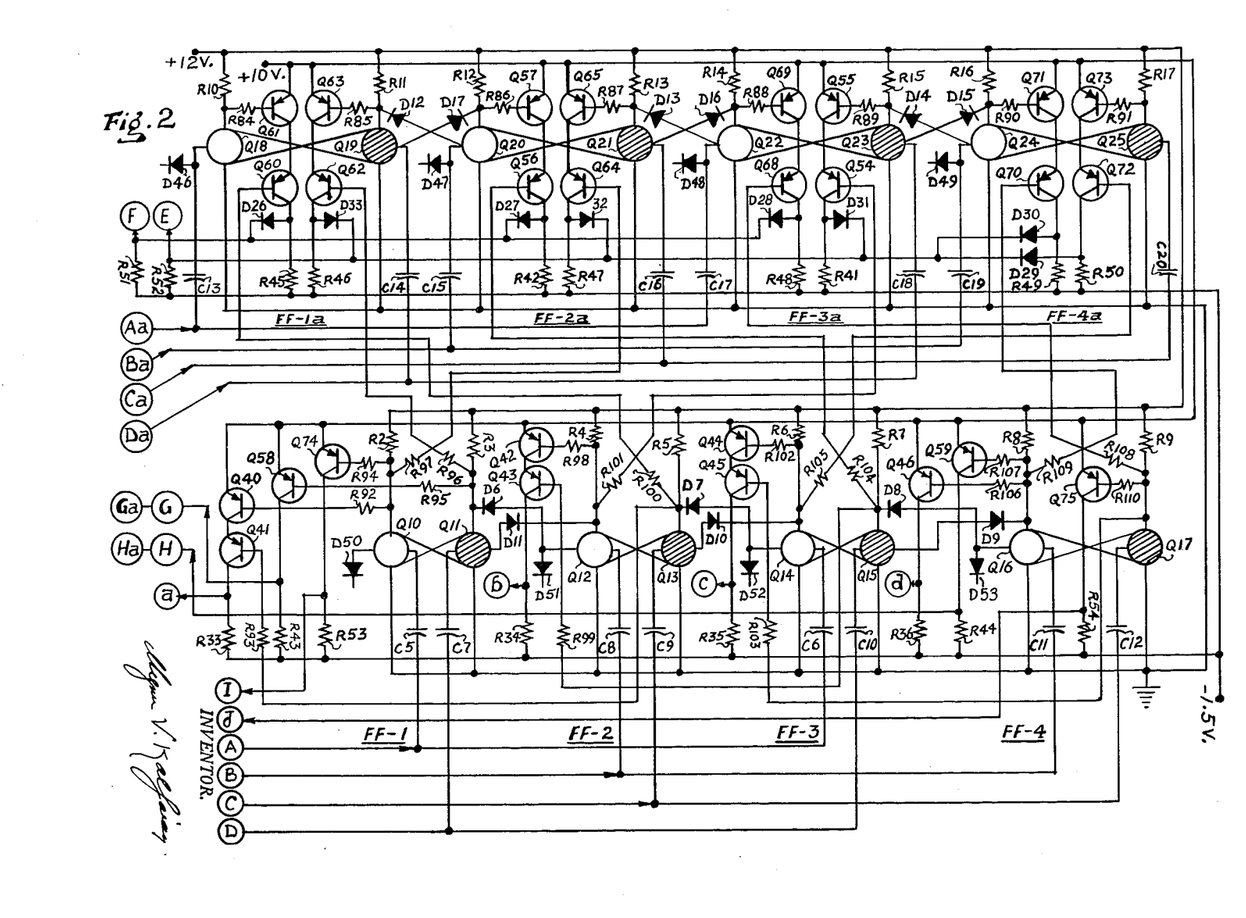
FIG. 2 is a distributor arrangement according to the invention.

In FIG. 2, there are shown two rows of flip flops, the first row comprising flip flops FF–1 through FF–4, and the second row comprising flip flops FF–1a through FF–4a. Referring to the lower row, each flip flop may comprise cross coupled two electron discharge devices for bistable operation. These flip flops may be of conventional design of the type that each half of the flip flop is energized alternately for operation, and therefore, they are shown in block form, such as, FF–1 comprising transistors Q10 and Q11 (in block form); FF–2 comprising Q12 and Q13 (in block form); FF–3 comprising Q14 and Q15 (in block form); and FF–4 comprising Q16 and Q17 (in block form). The shaded blocks Q11, Q13, Q15 and Q17 represent initial settings of conductive states of the flip flop transistors, and the resistors R2 through R9 are assumed to represent the collector circuit resistors of transistors Q10 through Q17, respectively. With the initial settings of bistable conductance, there is provided a direct diode coupling from the collector circuit of the conductive transistor of a preceding flip flop to the input (base electrode circuit) circuit of the non conductive transistor of the succeeding flip flop, the diode polarity being so arranged that the said conductive side short circuits any pulse signal (capacitively coupled) applied to the nonconductive side; thus preventing change of operating state of any flip flop before its preceding one has made that change. Similar direct diode couplings are also provided in reverse direction for backward operation of the flip flops. In the given arrangement, the diode D6 is directly connected from the collector circuit of conductive transistor Q11 to the base circuit of non-conductive Q12; the diode D7 is connected from collector circuit of conductive Q13 to the base circuit of non conductive Q14; and the diode D8 is connected from the collector circuit of conductive Q15 to the base circuit of non conductive Q16. As an operating example, when Q13 of FF–2 is in a conductive state, the collector current passing through resistor R5 drives the cathode end of diode D7 to near ground potential, and any positive pulse signal applied upon the input of non conductive transistor Q14 of FF–3 finds a shorter electrical path through diode D7 to ground than through the higher impedance input path of Q14, preventing the non conductive transistor Q14 from establishing a conductive state. This action is similarly related to the other flip flops by the coupling diodes D6 and D8. When the flip flops FF–1 through FF–4 have operated sequentially so that their left handed sides are in conductive states, the coupling diodes D9 through D11 allow changing of conductive states of the flip flops sequentially starting from FF–4 toward FF–1 in the previous fashion.

*Operation of distributor arrangement*

In operation, assume first that the shaded transistors Q11, Q13, Q15 and Q17 of flip flops FF–1 through FF–4 are initially set to operating states. Assume also that Q10 through Q17 are chosen of the NPN type, and that the incoming pulse signals are in positive direction. The first of these incoming pulse signals from terminal A is applied simultaneously upon the inputs of nonconductive transistors Q10 and Q14 of FF–1 and FF–3, by way of independent coupling capacitors C5 and C6. As stated in the above paragraph, the initially conductive state of Q13 drives the cathode end of diode D7 to near ground potential, and accordingly, the positive pulse applied to the input of Q14 is mostly shunted to ground by way of the anode connection of diode D7. Whereas, the positive pulse applied upon the input of nonconductive transistor Q10 drives it to conductive state, and causes FF–1 to change its stable state; at the same time driving the cathode end of diode D6 to positive potential. The second incoming positive pulse from terminal B is applied simultaneously to the inputs of nonconductive transistors Q12 and Q16. In the same previous fashion, and because of Q15 being in conductive state, the diode D8 shunts to ground the positive pulse signal applied to Q16 and prevents it from becoming conductive. Whereas, the input of Q12 receives the applied pulse signal in full and assumes a stable conductive state. The third incoming signal from terminal A is again applied to the inputs of Q10 and Q14, which in this case, causes Q14 to assume a stable conductive state, as Q10 has already been in a stable conductive state. In the same preceding mode, the fourth incoming pulse signal from terminal B is applied simultaneously upon the input circuits of Q12 and Q16, causing Q16 to assume a stable conductive state and Q17 nonconductive state. Thus at the end of the fourth input signal, all of the left handed sides of flip flops FF–1 through FF–4 have become conductive in stable states, and the right handed sides nonconductive. In order to reverse this sequential triggering process, the incoming positive pulse signals are now applied upon the input circuits of right handed sides of the flip flops, commencing FF–4 toward FF–1. In this case, the diodes D9 through D11 prevent operation of any one of the FF–1 to FF–4 flip flops more than once during said sequentially reverse triggering. As an example, the input signal from terminal C is applied simultaneously upon the inputs of flip flop transistors Q17 and Q13, causing Q17 to become conductive and Q16 nonconductive. In this case, Q13 is prevented from becoming conductive, as the conductive state of Q14 has driven the cathode end of diode D10 to near ground potential, causing the input signal to be shunted to ground by diode D10. The following incoming pulse signal from terminal D is applied simultaneously upon the input circuits of Q15 and Q11, which by the aid of D11 only FF–3 changes its state of conductance. Similarly, the successive incoming pulse signals are first applied simultaneously to the input circuits of Q13, Q17 from terminal C for operation of the flip flop FF–2, and then to the input circuits of Q15, Q11 from terminal D for final operation of the flip flop FF–1. All of the inputs of FF–1 through FF–4 are excited by way of coupling capacitors C5 through C12. Thus, it will be seen that the distributor arrangement of FIG. 2 is capable of operating sequentially in either forward or backward directions, and distribute independent pulse signals to the arrangement of FIG. 1, to be described further in detail.

The upper row of flip flops, designated as FF–1a through FF–4a, are arranged in a similar fashion as the lower row of flip flops, except that the upper row is used to operate simultaneously with the lower row during write period, and hold its last operating point for controlling the number of operations of the flip flops in the lower row during read period. For example, if during write time base period the flip flops FF–1 through FF–3 and FF–1a through FF–3a had operated in forward direction, the upper row of flip flops are stopped from further operation during read time base period, and it controls the lower row of flip flops not to operate beyond FF–3. Similarly, if during write time period the flip flops FF–4 through FF–2 and FF4a through FF–2a had operated in backward direction, the upper row of flip flops are stopped from further operation during read time period, and it controls the lower row of flip flops to operate from FF–1 through FF–4 in forward direction but not to operate beyond FF–2 in backward direction. These control actions will require further switchings, which will be described further.

While the circuit and operation of the flip flops FF–1a through FF–4a is the same as the circuit and operation of flip flops FF–1 through FF–4, the component parts are designated, as follows: Flip flop FF–1a consists of transistors (in block form) Q18, Q19; FF–2a consists of Q20, Q21 (in block form); FF–3a consists of Q22, Q23 (in block form); and FF–4a consists of Q24, Q25 (in block form). The cross coupled diodes D12 through D17 between the successive flip flops FF–1a through FF–4a are arranged in the same order, as described by way of FF–1 through FF–4. Similarly, the resistors R10 through R17 are assumed to be connected in the collector circuits of flip flop transistors (in block form) Q18 through Q25. The shaded transistors Q19, Q21, Q23 and Q25 (in block form) also represent the initial conductive states of FF–1a through FF–4a, in similar manner as described by way of flip flops FF–1 through FF–4. The input circuits of FF–1a through FF–4a are energized by the alternately shifting input pulse signals from terminals Aa, Ba, Ca and Da through coupling capacitors C13 to C20, inclusive, in a similar manner as described by way of the flip flops FF–1 through FF–4.

Figure 3:
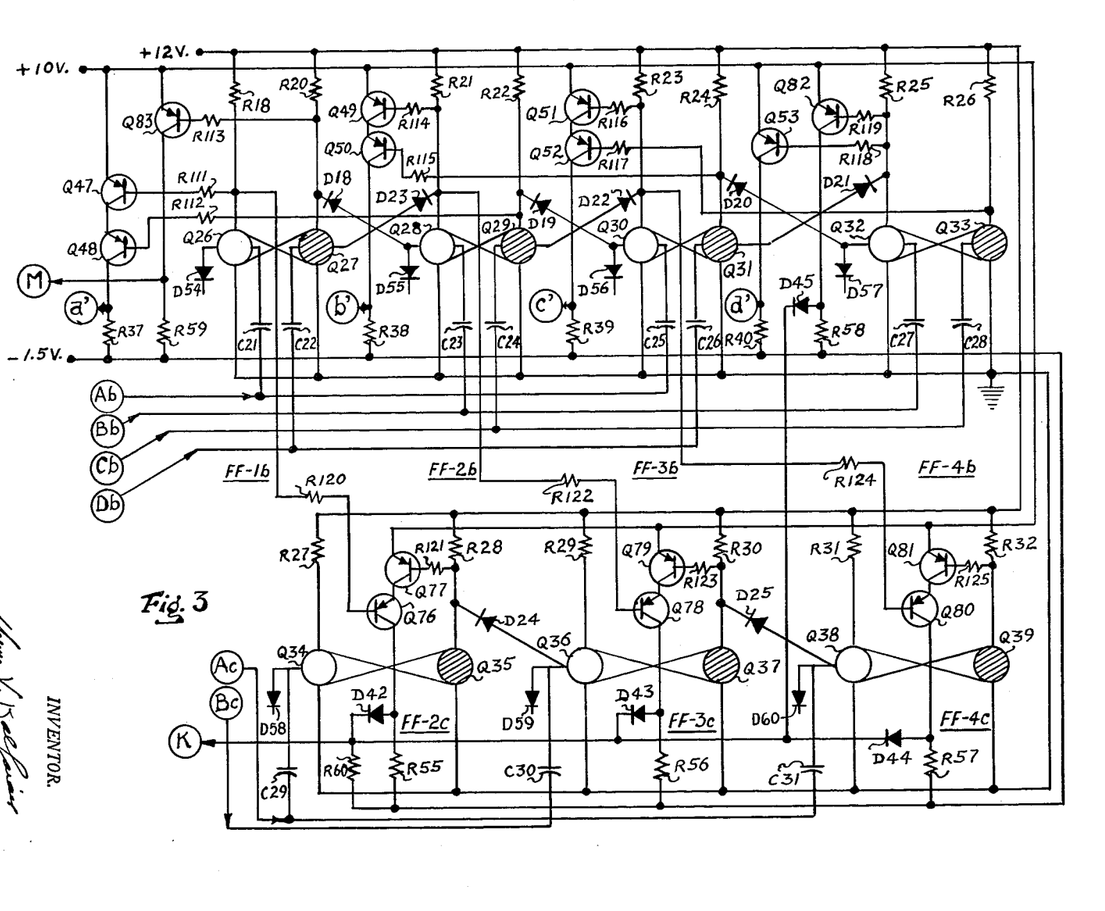
FIG. 3 is a distributor arrangement coacting with the arrangement of FIG. 2.

Prior to describing the manner in which flip flops FF–1a through FF–4a control the distribution limit of FF–1 through FF–4, which are used for digit count, reference is first made to the upper and lower rows of flip flops in FIG. 3, which are used for unit count. The upper row comprises flip flops FF–1b through FF–4b, and the lower row comprises flip flops FF–2c through FF–4c; the first flip flop, in this case, being omitted, as it is not necessary. The upper row of flip flops represents a distributor in unit count, and the lower row represents a count memory of the upper row. Both the upper and lower rows of flip flops in FIG. 3 have exactly the same circuits and operating conditions, as the upper and lower rows of flip flops in FIG. 2, and accordingly, further detailed description of the former will not be necessary herein. The duties of these flip flops, however, differ, in that, distribution by the flip flops FF–1 through FF–4 is in digit count, and distribution by the flip flops FF–1b through FF–4b is in unit count. Further, the flip flops FF–1a through FF–4a are arranged to reverse the distribution sequence of flip flops FF–1 through FF–4 at a limit count, whether the FF–1 to FF–4 were originally distributing in forward or backward direction. Whereas, the flip flops FF–2c through FF–4c are arranged to reverse the distribution sequence of flip flops FF–1b through FF–4b only when they are operating in forward direction. In order to designate the component parts of flip flops FF–1b through FF–4b, and FF–2c through FF–4c, reference is made, as follows:

In FIG. 3, the flip flop FF–1b (in upper row) comprises transistors (in block form) Q26, Q27; FF–2b comprises Q28, Q29 (in block form); FF–3b comprises Q30, Q31 (in block form); and FF–4b comprises Q32, Q33 (in block form). In the lower row, flop flop FF–2c comprises Q34, Q35 (in block form); FF–3c comprises Q36, Q37 (in block form); and FF–4c comprises Q38, Q39 (in block form). In the same circuit arrangement, as described by way of the arrangement in FIG. 2, the resistors R18 through R26 (in FIG. 3) are assumed to be in the collector circuits of the transistors (in block form) Q26 through Q33 of flip flops FF–1b through FF–4b, and the resistors R27 through R32 are assumed to be in the collector circuits of transistors Q34 through Q39 (in block form) of flip flops FF–2c through FF–4c. Similarly, the cross coupled diodes D18 through D23 between FF–1b through FF–4b are included for sequential forward and backward operation of these flip flops. Whereas, the coupling diodes D24 and D25 between FF–2c through FF–4c are arranged for only forward operation of these flip flops. The input circuits of flip flops FF–1b through FF–4b are excited by pulse signals from terminals Ab, Bb, Cb and Db through individual coupling capacitors C21 through C28. Further, the input circuits of flip flops FF–2c through FF–4c are excited by pulse signals received from terminals Ac, Bc, via individual coupling capacitors C29 through C31.

*Output distribution pulses*

Distribution steps of the flip flops FF–1 through FF–4 take place during short pulse periods, whereas, distribution steps of the flip flops FF–1b through FF–4b take place during substantially longer time periods than the former. Accordingly, the outputs of both sides of the flip flops FF–1 through FF–4 may be obtained by small coupling capacitors. But, it is preferred herein to employ direct coupling for the outputs of FF–1b through FF–4b, so as to obtain sharp transfer from one step of operation to the following. To make all flip flops alike, however, the outputs of FF–1 through FF–4 are also shown for direct coupling. In order to obtain a stepwise on-and-off condition from direct coupling, the output of each flip flop is passed through one half of a gate circuit, and the other half is directly coupled to the opposite operating side of the following flip flop. For example, assume first that the shaded sides Q11, Q13, Q15 and Q17 of FF–1 through FF–4 are normally conducting, and FF–1 has just reversed, rendering Q10 conductive. The negative voltage drop across R2 is applied to the base of PNP gate transistor Q40 to turn it on, and since a negative voltage from R5 of the operating Q13 is already applied to the base of series connected PNP transistor Q41, current flows through the output resistor R33, the output of which is represented as the first count of distribution at terminal a, further connected to the terminal a in FIG. 1. During the second distributing operation when FF–2 reverses its stable state, Q13 becomes non-conductive and removes the forward bias upon the base of Q41, which in turn removes the current flow through R33. At the same time, the voltage drop across R4 is applied upon the base of Q42, and by reason of Q43 being already forward biased by the negative voltage drop across R7 of conducting Q15 current flows through output resistor R34, the output of which is represented as the second count of distribution at terminal b, further connected to the terminal b in FIG. 1. Thus, it is seen that each time a flip flop of FF–1 through FF–4 operates, it produces an output pulse lasting in steady state until a succeeding flip flop operates. Operation of the third flip flop is similar to the preceding ones, and for reference, the output at terminal c is obtained from the output resistor R35 of gate comprising series connected transistors Q44 and Q45; the base of Q44 being acted upon by the voltage developed across resistor R6 when Q14 starts conducting, and the base of Q45 being acted upon by the voltage developed across resistor R9 of the already conducting Q17. The last output signal at terminal d is taken from output resistor R36, which in this case, is connected to the collector electrode of a single transistor Q46, since in the last stage of the flip flops FF–1 through FF–4 gating is not necessary; the base of Q46 being acted upon by the voltage developed across R8.

The output pulses at terminals a′, b′, c′ and d′ from flip flops FF–1b through FF–4b are taken from series connected transistor gates, as described by way of the flip flops FF–1 through FF–4. In the former case, the gate of FF–1b consists of Q47 and Q48, with output resistor R37 connected to the output terminal a′; the base of Q47 being connected to R18, and the base of Q48 being connected to R22. The gate of FF–2b consists of Q49 and Q50, with output resistor R38 connected to the output terminal b′; the base of Q49 being connected to R21, and the base of Q50 being connected to R24. The gate of FF–3b consists of Q51 and Q52, with output resistor R39 connected to the output terminal c′; the base of Q51 being connected to R23, and the base of Q52 being connected to R26. In the last stage, the output signal at terminal d′ is obtained from the collector circuit resistor R40 of on-and-off transistor Q53, the base of which is energized by the voltage developed across R25 when Q32 operates.

*Memory control of the distributor flip flops*

In reference to the arrangement of FIG. 2, it was described in the foregoing that during write time period the flip flops FF–1a through FF–4a operate simultaneously with FF–1 through FF–4, and remain idle at the last operating state during read time period, as a memory control for FF–1 through FF–4. For example, assume that during write time period the flip flops FF–1a and FF–2a have assumed conductance on their left handed sides, and stopped from further operation. During read time period, FF–1 operates first, its left handed side assuming conductance, and FF–2 operates next, its left handed side assuming conductance. At this point, the conductance of Q12 produces a negative voltage drop across resistor R4, which is applied as forward bias upon the base of PNP transistor Q54 of FF–3a. Since the base of series connected transistor Q55 is already forward biased by the operation of Q23, current passes through collector circuit resistor R41 for producing an output signal at terminal E that may be utilized to control the sequence reversal of FF–2. The function of the output signal at terminal E would be to shift the input signals from terminals A and B to terminals C and D. Since FF–1 through FF–4 and FF–1a through FF–4a are arranged for digit count, it may happen that during write time period the flip flops FF–1a and FF–2a assume conductance on their left handed sides from a direction of backward sequential operation. In this case, when FF–3 operates from backward sequence and Q15 assumes conductance, the negative voltage drop across R7 is applied as forward bias upon the base of Q56 of FF–2a, and since the base of series connected gate transistor Q57 is already forward biased by the negative voltage drop across R12, current flows through collector circuit resistor R42, producing an output signal at terminal F as a control signal for shifting the input signals from terminals C and D to terminals A and B. Thus, the output control signal at terminal E is used to shift the operating sequence of FF–1 through FF–4 from forward to backward direction, and the output signal at terminal F is used to shift the operating sequence of FF–1 through FF–4 from backward to forward direction. At this point, it should be mentioned that operation of the last flip flop FF–4 must always produce a sequence reversing signal whether it is produced at terminal Ha or at E. For this reason, the voltages developed across output resistors R49 and R50 of gate transistors Q70, Q71 and Q72, Q73 of the last flip flop FF–4a are both coupled to the terminal E by the isolating diodes D29 and D30. In the arrangement shown, however, when FF–1a and FF–2a have assumed conductance on their left handed sides, there is no way of telling whether such operation has ended after forward or backward sequence during write time period. In order to recognize this state, the output signals at terminals E and F are first passed through separate gates and self switching off arrangements prior to shifting the input signals at terminals A, B, and C, D. These gates are switched on or off by the first and last operating states of FF–1 through FF–4 during read time period, so arranged that, when Q10 of the first flip flop FF–1 assumes conductance it produces an output signal at terminal G to shut off the output signal at terminal F, while when Q16 of the last flip flop FF–4 assumes conductance it produces an output signal at terminal H to shut off the output signal at terminal E. Thus at the end of write time period if one of the flip flops FF–1 through FF–4 has ended operation from forward sequence, the output signal at terminal F is switched off, while when one of these flip flops has ended operation from backward sequence, the output signal at terminal E is switched off. Coacting with this switching operation, the outputs at terminals F and E are automatically switched off immediately after either signal is transmitted during read time period; the switching-on condition being reestablished by an output signal arriving from the last memory count of the flip flops FF–2c through FF–4c in FIG. 3, which will be described further. At this point it must be emphasized that the output control signals at terminals E and F are used only once for reversing the sequence of FF–1 through FF–4 during an entire distribution count by FF–1 through FF–4 and FF–1b through FF–4b. Whereas, the sequence of flip flops FF–1 through FF–4 must be reversed both at the beginning and ending of distribution, for continual operation. This is achieved by the output control signals at terminals Ga and Ha, which are produced by the first flip flop FF–1 and the last flip flop FF–4. Thus assuming that the shaded sides of all flip flops are initially set to conductance, the negative voltage drop across resistor R3 of FF–1 drives Q58 conductive, and the current passing through resistor R43 produces the output control signal at terminals G and Ga; the signal at Ga being used to shift the input signals from terminals C, D to A, B for forward operation of the flip flops FF–1 through FF–4. At the end of this operation when Q16 of FF–4 becomes conductive, the negative voltage drop across R8 drives the PNP transistor Q59 conductive and causes current to pass through collector circuit resistor R44, which in turn produces an output signal at terminals H and Ha. The signal at Ha causes the input signals at terminals A, B to shift to terminals C and D for reverse operation of the flip flops. The output signals at terminals I and J are used for sequential operation of the flip flops FF–1b through FF–4b and FF–2c through FF–4c in FIG. 3. The output signal I is obtained from across collector circuit resistor R53 of transistor Q74, the base of which is energized by the voltage drop from across R2 when Q10 assumes conductance. The output signal J is obtained from across collector circuit resistor R54 of transistor Q75, the base of which is energized by the voltage drop from across R9 when Q17 assumes conductance. The outputs from I and J are taken by way of capacitive coupling, so that the steady state operation of either Q10 or Q17 will not cause operation of outgoing circuits (to be described) during undesired time periods. Thus, during write time period, at the beginning of operation of FF–1 through FF–4, in either forward or backward sequence, an output signal at either terminal I or J is produced, to be further used to shift the operation of flip flops FF–1b through FF–4b and FF–2c through FF–4c, one step in forward sequence. During read time period, the signals at terminals I and J are further switched for shifting the operational sequence of last said flip flops, to be further described.

Continuing with the operation of flip flops FF–1a through FF–4a, the function of gates comprising Q54, Q55, and Q56, Q57 has been described. Since the functions of the rest of the gates are similar, it will suffice to make only reference to the component parts associated with each flip flop. Thus, the gates associated with the flip flop FF–1a comprises series connected transistors Q60, Q61 with collector circuit resistor R45, and series connected transistors Q62, Q63 with collector circuit resistor R46. The gates associated with FF–2a comprises series connected transistors Q56, Q57 with collector circuit resistor R42, and Q64, Q65 with collector circuit resistor R47. The gates associated with FF–3a comprise series connected transistors Q68, Q69 with collector circuit resistor R48, and Q54, Q55 with collector circuit resistor R41. And the gates associated with FF–4a comprise series connected transistors Q70, Q71 with collector circuit resistor R49, and Q72, Q73 with collector circuit resistor R50. The diodes D26 through D30 are utilized as isolating elements for mixing the output control signals from the gates just mentioned across output load resistors R51 and R52.

With the functional specification of the control flip flops FF–1a through FF–4a, coacting with the flip flops FF–1 through FF–4, as described in the foregoing, reference is now made to the function of flip flops FF–2c through FF–4c, coacting with FF–1 through FF–4 in FIG. 3.

Figures 4, 5:
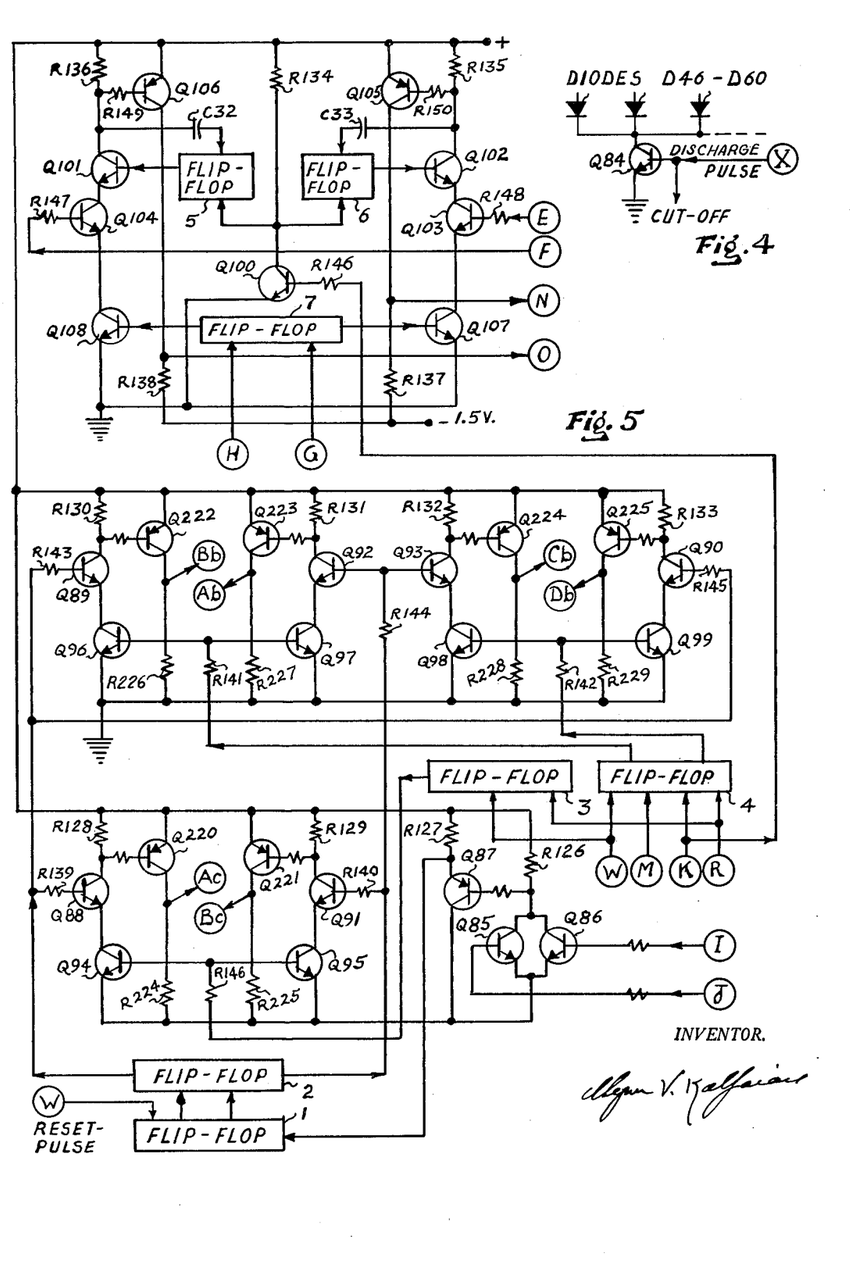
FIG. 4 is a resetting arrangement for the distributors in FIGS. 2 and 3.
FIG. 5 is a schematic switching arrangement coacting with the distributors in FIGS. 2 and 3.

As mentioned in the foregoing, FF–2c through FF–4c operate sequentially only in forward direction during write time period, and remain at the last operating stage during read time period, for the control of FF–1b through FF–4b. Thus assume, for example, that during write time period FF–2c and FF–3c have assumed conductance on their left handed sides. When FF–1b stabilizes itself with conductance of Q26, the voltage drop across R18 biases the base of gate Q76 in forward direction, but since at this time the base of series connected transistor Q77 has not received forward bias, due to non conductance of Q35 of FF–2c, current does not pass through collector circuit resistor R55. On the next step when the Q28 of FF–2b assumes conductance, the base of gate Q78 receives a forward bias from R21, but again, since at this time the base of series connected transistor Q79 has not received forward bias, due to non conductance of Q37 of FF–3c, current does not pass through the collector circuit resistor R56. However, when on the third step the Q30 of FF–3b assumes conductance, the base of gate Q80 receives a forward bias from across R23, and because the base of series connected transistor Q81 has already received forward bias from across R32, due to conductance of Q39, current flows through collector circuit resistor R57 resulting an output signal transmitted to the terminal K. This signal at K is further utilized to shift the input pulse signals from terminals Ab, Bb to terminals Cb, Db for reversing the sequence of operation from FF–3b toward the left of the upper row of flip flops. When the last flip flop FF–4c has operated on its left handed side during write time period, then during read time period the output signal at terminal K is obtained only by the operation of Q32 of FF–4b. That is, when Q32 assumes conductance, the base of transistor Q82 receives a forward bias from across R25 and current flows through collector circuit resistor R58 for producing the output signal at terminal K. For sequence reversal from backward to forward direction, and assuming that the Q27 of FF–1b has just stabilized itself in a conductive state, the base of gate transistor Q83 receives a forward bias from R20 and causes current flow through its collector circuit resistor R59, resulting in an output signal at terminal M. This signal at terminal M is then utilized for shifting the input signals from terminals Cb, Db to terminals Ab, Bb for forward operation of the flip flops in the upper row. The diodes D42 through D45 are utilized as isolation elements for the output signals developed across load resistor R60 before being transmitted to terminal K. The signal at terminal K is also utilized to switch the control signals at terminals E and F in FIG. 2, in ON position. Also, as reference, all transistors in FIGS. 2 and 3 are shown with series connected resistors at their base elements, as safety of operation, although they may not be needed. Thus, for reference, these resistors are designated as, R84 through R125. Further, it had been mentioned in the foregoing that all of the flip flops in FIGS. 2 and 3 are initially set, such that, all shaded areas on the right handed sides are conducting. While different ways have been practiced for such resetting of flip flops, it is preferred to use diodes, herein. Thus, the anode terminals of independent diodes D46 through D60 are connected to the left handed sides of these flops, as shown in the drawing, and the cathode terminals (left open in the drawings for simplicity of drawing) are connected in parallel, to be driven to ground for resetting operation. This driving to ground operation may be achieved by simply connecting all parallel connected cathode terminals of these diodes to the collector terminal of a normally non conductive transistor, such as shown by Q84 in FIG. 4, and apply a forward pulse from terminal X to the base of this transistor for conductance, and therefore, driving the parallel connected cathode terminals of these diodes to ground. For simplicity of drawing, and for reference only, the diodes in FIG. 4 are designated to represent the diodes D46 through D60.

*Alternate signal for operation of the flip flops*

Up to this point, the mode of operation of the flip flops in FIGS. 2 and 3 has been described. And now reference will be made to their input and output signals, and how they are switched alternately for their proper operation. First making reference to the flip flops FF–1b through FF–4b, in FIG. 3, it was described that their excitation inputs are received from the output signals at terminals I and J in FIG. 2. The sequence of these signals, however, is not always alternate, and they must be first changed into alternate sequence by the switching arrangement of FIG. 5. In this arrangement, the input signals I and J are applied separately to the base elements of Q85 and Q86, the collector electrodes of which are connected in parallel, in series with resistor R126, thus mixing the input signals I and J unidirectionally across resistor R126. The signal across R126 is further applied to the base of emitter follower transistor Q87, which in turn energizes the flip flop in block 1 from across resistor R127. Each time the flip flop 1 is energized it produces an output signal in alternate polarity. In the case of high frequency operation, the output of the flip flop in block 1 may not be of good waveshape, and therefore, the alternate output of block 1 is further applied to the alternately operated flip flop in block 2 for obtaining a better defined output waveshape. The alternate output signals from block 2 are applied alternately to the bases of gate circuit transistors Q88 to Q90 in parallel, and to the bases of Q91 to Q93 in parallel. During write time period, the alternate switch in block 3 applies a forward bias upon the base elements of series connected transistors Q94 and Q95, so that the alternate signals from block 2 appear across the collector resistors R128 and R129, from which the output signals at terminals Ac and Bc are produced by way of phase inverter transistors Q220, Q221, and resistors R224, R225. At the same time, the alternately operated flip flop in block 4 applies a forward bias upon the base elements of series connected gate transistors Q96, Q97, and the alternate signals from block 2 appear across collector circuit resistors R130 and R131, thus producing the output signals at terminals Ab and Bb by way of phase inverter transistors Q222, Q223, and resistors R226, R227. The flip flop in block 1 is reset before write time period, so as to make the production sequence of output signals starting from terminal Ab. Similarly, the switches of flip flops in blocks 3 and 4 are set before write time period, so that the Q94 through Q97 are in ON positions. During read time period, a pulse signals is applied from terminal R to the blocks 3 and 4 to reverse their states of operation, so that first, the gate transistors Q94, Q95 are shut off by block 3 to prevent the signals Ac, Bc being transmitted to the flip flops FF–2c through FF–4c in FIG. 3, and second, the flip flop in block 4 shuts off the gate transistors Q96, Q97 at the same time applying forward bias to the gate transistors Q98, Q99, so that the alternate signals from block 8 are now shifted from output terminals Ab, Bb to terminals Cb, Db from across resistors R132 and R133 by way of phase inverter transistors Q224, Q225, and resistors R228, R229, for reversing the sequence of operation of the flip flops FF–1b through FF–4b in FIG. 3. After the initial alternate settings of blocks 3 and 4, the flip flop in block 4 is switched alternately by the input signals at terminals K and M, for example, the signal at K changing the state of block 4 so that Q96, Q97 are shut off, and the signal at M changing the state of block 4 so that Q98, Q99 are shut off.

The signal at terminal K is also used to control the active and inactive conditions of the flip flops FF–1a through FF–4a during read time period. For example, when a signal appears at terminal K it is applied upon the base element of transistor Q100, which by way of its collector circuit resistor R134 applies operating signals upon the flip flops in blocks 5 and 6. These flip flops in turn apply forward bias upon the base elements of gate transistors Q101 and Q102, so that when the input signals at terminals E and F appear upon the bases of series connected gate transistors Q103 and Q104 current will flow through the series connected transistors and through collector circuit resistors R135 and R136. The voltage developed across R135 is then applied upon the base of Q105 in forward direction, and the voltage developed across R137 is transmitted to the output terminal N. Similarly, the voltage developed across R136 is applied upon the base element of Q106 in forward direction, and the voltage developed across R138 is transmitted to the output terminal O; the signals at N and O being used to determine the backward and forward reversals, respectively, of the flip flops FF–1 through FF–4 in FIG. 2. As described in the foregoing, the signals at E and F may be present simultaneously, and a means should be provided to shut off the unwanted signal. This is achieved by including a third transistor Q108 connected in series with Q101, Q104, and a third transistor Q107 connected in series with Q102, Q103. The base elements of gate transistors Q107 and Q108 are then biased either in forward or backward direction by the alternately operated flip flop in block 7. Thus, the input signal at terminal G operates the block 7 so that the base of Q107 is forward biased, and the signal at terminal H operates the block 7 so that the base of Q108 is forward biased. After a signal is transmitted to either terminal N or O, it must be stopped from such transmittal, until a signal from terminal K arrives again. This self shutting off condition is achieved by the coupling capacitors C32 and C33 feeding back to the blocks 5 and 6, respectively. For example, when current passes through R136, the voltage developed across it is applied through C32 to the flip flop in block 5, so that it operates and applies a backward bias upon the base of Q101. Similarly, when current passes through R135, the voltage developed across it is applied through C33 to the flip flop in black 6, so that it operates and applies a backward bias upon the base of Q102. The resistors R139 through R150 connected in series with the base elements of various transistors are used against overloading, and they may be dispensed with if not needed.

Figure 6:
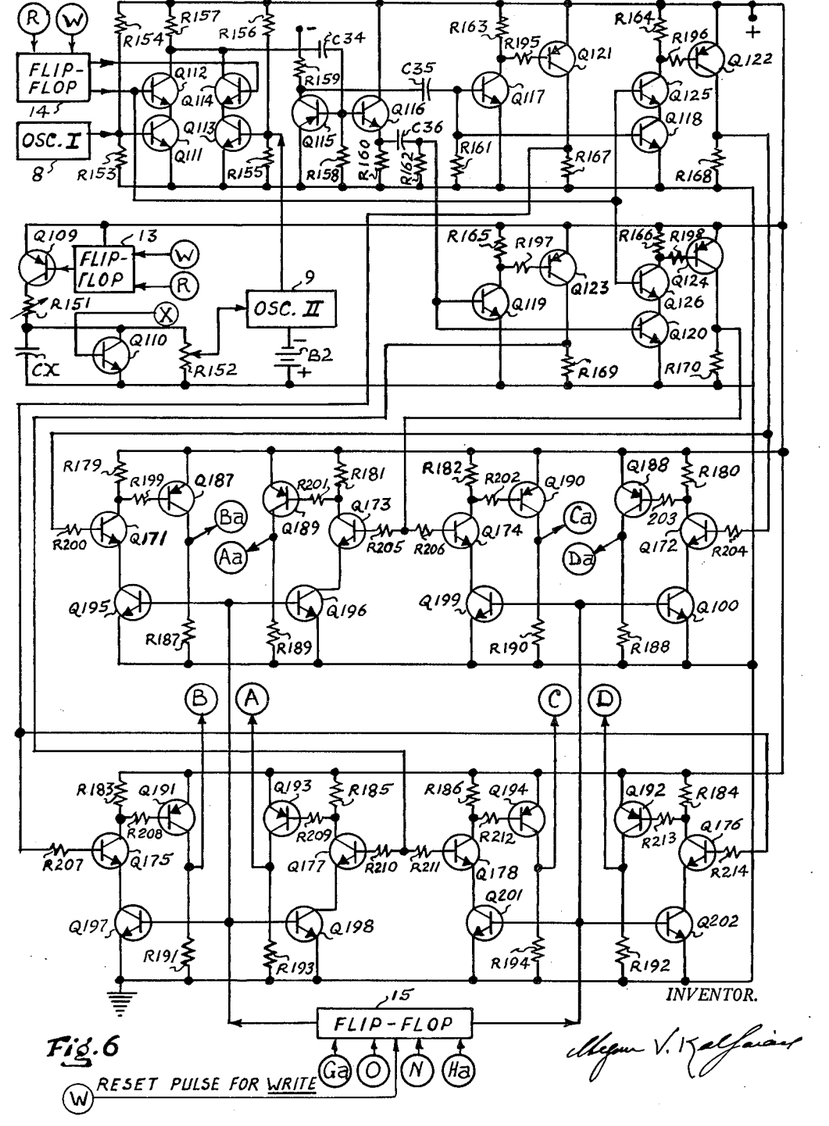
FIG. 6 is a further switching arrangement coacting with the distributors in FIGS. 2 and 3.

Up to this point, generation of unidirectional alternate signals for the operation of the flip flops in FIG. 3 has been described. The generation of unidirectional alternate signals for the operation of the flip flops in FIG. 2 is obtained from two different sources, one being generated at a constant reference frequency during write time period, and the other being generated during read time period. The latter generation is controllable, and its frequency is varied during write time period by an amount that it will produce the same number of output waves during read time base period as had been produced during the write time base period; both time base periods differing one another. This condition is described, as in the following:

The block diagram 8 in FIG. 6 represents an oscillator OSC. I of constant frequency for producing a reference frequency of waves during write time base period, while the block 9 OSC. II represents a voltage sensitive oscillator of variable frequency for producing the required number of waves during read time base period. The frequency in block 9 is shifted during write time base period, and it remains in steady state during read time base period. This shifting voltage is produced across capacitor CX, as follows:

Assuming the source of signals in block 10 of FIG. 1 to be of speech sound waves, the fundamental frequencies of these waves are first selected by the block 11. Detailed circuit arrangements of such fundamental frequency selectors are disclosed in my U.S. Patent Number 2,872,517 dated Feb. 3, 1959, and reference may be made to it. The output of this fundamental frequency selector is then applied to an alternate switch in block 12, which in turn produces alternate output pulses at terminals W and R for write and read operations. Assuming that the terminal W is used for write operation, and the terminal R is used for read operation, these terminals are connected to the inputs of on-and-off switch 13 in FIG. 6. At the start of write period, the switch in block 13 applies a forward bias to the base electrode of transistors Q109, and the capacitor CX starts charging to the positive potential (as marked in the drawing) in series with the timing resistor R151. The parallel connected transistor Q110 is normally reverse biased, so that it represnts open circuit. Similarly, the capacitor CX and the parallel connected resistor R152 are chosen of large values so that the capacitor CX may practically be considered as without a load across it. At the end of said write period, the switch in block 13 is altered in its stable state by a pulse received at its terminal R, and the capacitor CX stops further charging by reason of Q109 becoming an open circuit. The capacitor CX holds the charge assumed at said switching point, and it is applied to the oscillator II in block 9 by way of a tap across the resistor R152. The proper amount of frequency shift of the oscillator in block 9 is preadjusted by the tap across resistor R152; by varying the value of resistor R151; and by applying a fixed bias from source B2 when necessary. Thus, the frequency of oscillator in block 9 is shifted during write time base period and is in steady state during read time period by proportional amount of the charge across CX, the magnitude of said charge being a representation of the write time base period. The oscillator in block 8 is switched on to the sequential flip flops during write period, and the oscillator in block 9 is switched on to the sequential flip flops during read time period, as in the following manner:

The output oscillator in block 8 (either sine or square wave) is applied upon one gate comprising series connected transistors Q111, Q112 and the output of oscillator in block 9 (either sine or square wave) is applied upon another gate comprising series connected transistors Q113 and Q114. The junction terminals between resistors R153, R154, and R155, R156 provide forward bias for the bases of transistors Q111 and Q113, so as to avoid rectification of the waves coming from blocks 8 and 9. Both of said oscillations appear at the common collector circuit resistor R157, but they are switched ON and OFF by the switching device in block 14, applying either forward or reverse bias to the bases of series connected transistors Q112 and Q114. As in the foregoing, the switching device in block 14 receives its control signals from input terminals W and R. Assuming first a write time period, the oscillation from block 8 appears across resistor R157, which in turn is coupled to the base elements of PNP transistor Q115 and NPN transistor Q116 across load resistor R158, by way of coupling capacitor C34. Due to the normal zero bias (reverse bias may be included if desired) upon the base elements of Q115 and Q116, both the negative and positive slopes of the alternating wave from across R157 are rectified in the collector circuit resistor R159 of Q115, and in the emitter circuit resistor R160 of Q116, in the same (positive) polarity but in alternate periods, because of the PNP and NPN characteristics of Q115 and Q116. The positive waves from across R159 are applied to the base elements of Q117, Q118 by way of coupling capacitor C35 upon load resistor R161, and the positive waves from across R160 are applied to the base elements of Q119, Q120 by way of coupling capacitor C36 upon load resistor R162. Thus, the rectified positive waves, as received alternately by the parallel connected base elements of Q117, Q118, and the parallel connected base elements of Q119, Q120 represent the oscillations of OSC. I during write time base period, and the oscillations of OSC. II during read time period. These alternately produced positive waves are further switched for the properly timed application to the flip flops in FIG. 2, as follows:

The negative voltages developed across collector circuit resistors R163 through R166 of transistors Q117 through Q120, respectively, are first phase inverted to positive polarity by application to the base elements of transistors Q121 through Q124, respectively, and the outputs taken from the collector circuit resistors R167 through R170 of the latter transistors, respectively. The output alternate positive waves from across resistors R167 and R169 are utilized to be transmitted to the inputs of flip flops FF–1 through FF–4 (in FIG. 2), and the output alternate positive waves from across resistors R168 and R170 are utilized to be transmitted to the inputs of flip flops FF–1a through FF–4a (in FIG. 2). Since the latter mentioned flip flops operate only during write time period, the input signals must be shut off during read time period. This is achieved by the series connected gate transistors Q125, and Q126, the base elements of which are connected in parallel to the switching block 14, so that when the output of OSC. I is shut off during read time period the outputs of R168 and R170 are also shut off.

The output of resistor R168 is applied in parallel to the base elements of gate transistors Q171, Q172, and the output of resistor R170 is applied in parallel to the base elements of gate transistors Q173, Q174. Similarly, the output of resistor R167 is applied in parallel to the base elements of gate transistors Q175, Q176, and the output of resistor R169 is applied in parallel to the base elements of gate transistors Q177, Q178. As shown in the drawing, the transistors Q171 through Q178 are chosen of the NPN type, and therefore their collector circuit resistors R179 through R186, respectively, being terminated to positive supply source, their outputs are first applied to phase inverter transistors Q187 through Q194, respectively, so that positive waves are obtained from their collector circuit resistors R187 through R194, respectively, and terminated to the output termianls A, B, C, D, and Aa, Ba, Ca, Da. As explained in the foregoing, the output signals at terminals A, B and Aa, Ba must be in ON position during forward operation of the flip flops (in FIG. 2), and the output signals at terminals C, D and Ca, Da must be in ON position during backward operation of these flip flops. Also, as explained in the foregoing, these forward and backward operations of these flip flops are controlled by the input signals at terminals Ga and Ha, and also by the signals at terminals N and O. Thus, these signals are first applied to the alternate sides of the flip flop in block 15, which in turn applies alternate forward and reverse bias upon the parallel connected base elements of series connected gate transistors Q195 through Q198, and the parallel connected base elements of series connected gate transistors Q199 through Q202. Since at the start of write time period the flip flop in block 15 may not be in the proper operating position, it is reset by an incoming pulse from terminal W, which represents the write pulse from terminal W of block 12 in FIG. 1. Also at the start of write period, the capacitor CX must have been discharged, which may be accomplished by the parallel connected normally idle transistor Q110. After read period has ended, a forward bias signal is applied to the base electrode of Q110 which in turn becomes conductive and discharges the capacitor CX for a new start of write action. This discharge signal at terminal X is received from the output of one shot in block 16 (FIG. 1), the operating time period of which is adjusted sufficiently less than the shortest time period during which a pitch period of the speech sound waves occurs, so as to allow said discharge action completed before write period starts. The resistors R195 through R214 connected in series with the base elements of their respective transistors are utilized as current limiters, and they may be dispensed with if not needed. Also, it is shown that most of the transistors used are of the NPN type, but these may be easily changed to PNP type without change in circuitry, except proper polarity terminations that are characteristic to these devices. In the event that only forward distribution of the sampled quantities in FIG. 1 is desired during read time base period, instead of the backward and forward distribution, as described in the foregoing, then it is only necessary to use the output signal at terminal K in FIG. 3 for resetting all the devices, as described. Further, it is noted that the distributor flip flops FF–1a through FF–4a, and FF–2c through FF–4c (in FIGS. 2 and 3) are utilized as memory devices; their last holding positions determining the total count of signal distribution. These holding positions of the different stages of said flip flops may be arranged to translate into voltages of incremental values, so that the total (as determined by the last holding positions of said flip flops) may represent the voltage developed across capacitor CX in FIG. 6; said capacitor and its associated component parts being dispensed with. Thus, it is seen that the system and apparatus shown in the accompanying drawings are only exemplary, and various modifications, adaptations, and substitutions of parts may be made without departing from the spirit and scope of the invention.

What I claim is:

1. A frequency conversion system for recording a complex wave during an unknown time period and reproducing it repeatedly in backward and forward directions in reference time base periods, the system comprising means for producing said complex wave; a first generator of waves at a first frequency; a second generator of waves of variable frequency; means for sampling the various amplitudes of the produced complex wave by the waves of the first generator; means for storing said samples; means for producing a control signal representative of the time period during which said samples had been stored; means for varying the frequency of said second generator by said control signal by an amount as to produce approximately the same number of waves during a reference time base period, as the number of said stored samples; and means for resampling the stored samples in backward and forward directions during said reference time base periods by the frequency-varied waves for reproducing the stored samples at a frequency conversion rate aforesaid.

2. A frequency conversion system for recording a complex wave during an unknown time period and reproducing it repeatedly in backward and forward directions in reference time base periods, the system comprising a means for producing said complex wave; a first generator of waves at a first frequency; a second generator of waves at variable frequencies; a wave distributing means; first and second on-and-off switching means between said distributor means and said first and second generators, respectively; a plurality of storage means; means for rendering said first switching means in ON position during said recording time period, whereby energizing said distributor means by the waves of the first generator; means for sampling the various amplitudes of the produced complex wave and storing among said plurality of storage means by said energized distributor; means for producing a control signal representative of said recording time period; means for varying the frequency of said second generator by said control signal by an amount as to produce approximately the same number of waves during a reference time base period; means for rendering said first switching means in OFF position and the second switching means in ON position, whereby energizing said distributor means by the waves of said frequency varied second generator; and means for resampling the stored samples in backward and forward directions during said reference time base periods by the last mentioned distributor means for reproducing the stored samples at a frequency conversion rate aforesaid.

3. The system as set forth in a claim 2, wherein said sequential distributor comprises a plurality of flip flops having first and second inputs, first and second outputs, and first and second stable operating states, respectively; a diode coupling means from the second output of a preceding flip flop to the first input of a succeeding flip flop, so polarized as to prevent operation of said succeeding flip flop to the first state prior to operation of a preceding flip flop to its first state; means for dividing the said signal-sampling waves at said first frequency into alternate first and second branches; and means for applying the output waves of said first branch simultaneously to the first inputs of every odd numbered said flip flops, and means for applying the output waves of said second branch simultaneously to the second inputs of every even numbered said flip flops, thereby effecting sequential operation of said plurality of flip flops.

4. The system as set forth in claim 2, wherein said sequential distributor comprises a plurality of flip flops having first and second inputs, first and second outputs, and first and second stable states, respectively; a diode coupling means from the second output of a preceding flip flop to the first input of a succeeding flip flop, so polarized as to prevent operation of a succeeding flip flop to the first state prior to operation of a preceding flip flop to its first state; means for dividing the said signal-sampling waves into alternate first and second branches; means for applying the output waves of said first branch simultaneously to the first inputs of every odd numbered said flip flops, and means for applying the output waves of said second branch simultaneously to the second inputs of every even numbered said flip flops, thereby effecting sequential operation of said plurality of flip flops; a plurality of gates associated with said plurality of flip flops, respectively, each gate having first and second inputs and an output; means for coupling the first input of each gate to the first output of its associate flip flop, and means for coupling the second input of last said gate to the second output of a succeeding flip flop, so that the output of each of said gates remains in operation only once during successive operations of said plurality of flip flops; and means for utilizing the outputs of said plurality of gates and the distributing signals.

5. The system as set forth in claim 2, wherein said sequential distributor comprises a plurality of flip flops having first and second inputs, first and second outputs, and first and second stable states, respectively; a first diode coupling means from the second output of a preceding flip flop to the first input of a succeeding flip flop, so polarized as to prevent operation of a succeeding flip flop to the first state prior to operation of a preceding flip flop to its first state; a second diode coupling means from the first output of a succeeding flip flop to the second input of a preceding flip flop, so polarized as to prevent operation of a preceding flip flop to the second state prior to operation of a succeeding flip flop to its second state; means for dividing the said signal-sampling waves into alternate first and second waves in a first branch, and alternate first and second waves in a second branch; first and second on-and-off switches associated with said first and second branches, respectively; means for rendering said first switch in ON position and means for applying said first waves in the first branch simultaneously to the first inputs of every odd numbered said flip flops, and means for applying said second waves in the first branch simultaneously to the second inputs of every even numbered said flip flops, thereby effecting sequential operation of said plurality of flip flops in forward directions; and means for rendering said first switch in OFF position, and said second switch in ON position and means for applying said first waves in the second branch simultaneously to the second inputs of every even numbered said flip flops, and means for applying said second waves in said second branch simultaneously to the second inputs of every odd numbered said flip flops, thereby effecting sequential operation of said plurality of flip flops.

6. A frequency conversion system for recording a complex wave during an unknown time period and reproducing it repeatedly in backward and forward directions in reference time base periods, the system comprising means for producing said complex wave; a first generator of waves at a first frequency; a second generator of waves at controllably variable frequency; a wave distributing means; a plurality of storage means; first and second on-and-off switching means between said distributor means and said first and second generators, respectively; means for rendering said first switching means in ON position during said recording time period, whereby energizing said distributor means by the waves of the first generator; means for sampling the various amplitudes of the produced complex wave and storing among said plurality of storage means by said energized distributor; means for producing a control signal representative of said recording time period; a means for varying the frequency of said second generator by said control signal by an amount as to produce the same number of waves during a reference time base period; means for rendering said first switching means in OFF position and the second switching means in ON position, whereby energizing said distributor means by the waves of said frequency varied second generator; means for resampling the stored samples in backward and forward directions during said reference time base periods by the last mentioned distributor means for reproducing the stored samples at a frequency conversion rate; means for counting the number of said stored samples; a memory means for said counted number; and means for controlling the backward and forward distribution of said distributor during said resampling period by said memory means, thereby resampling the same number of storage samples during each of said backward and forward distribution.

7. The system as set forth in claim 6, wherein is included means for resetting said distributor means to a normal operating position prior to said recording time period.

References Cited by the Examiner

UNITED STATES PATENTS 3,054,063    9/1962    Kalfaian _______ 328—185

ARTHUR GAUSS, *Primary Examiner.*